W. MAPLE.
WATER FILTER.
APPLICATION FILED OCT. 27, 1919.
1,362,125.
Patented Dec. 14, 1920.
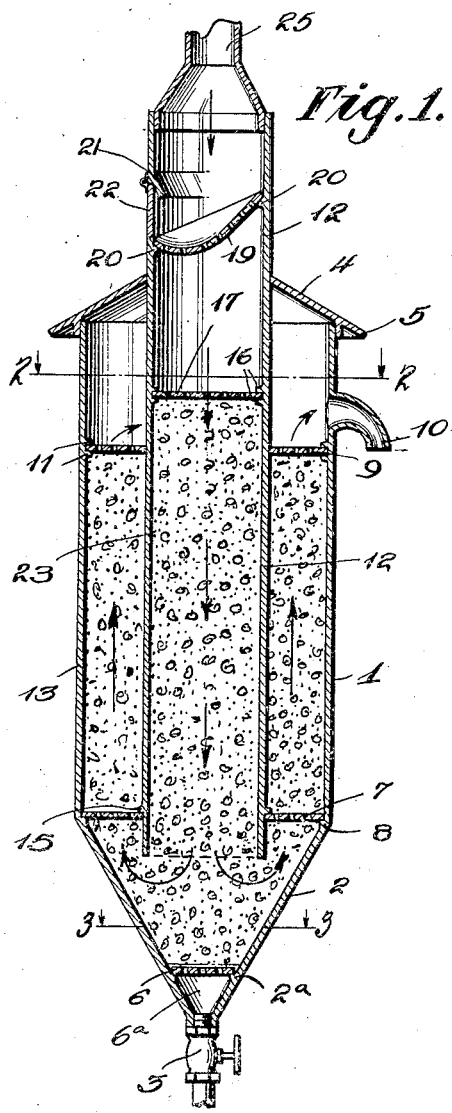
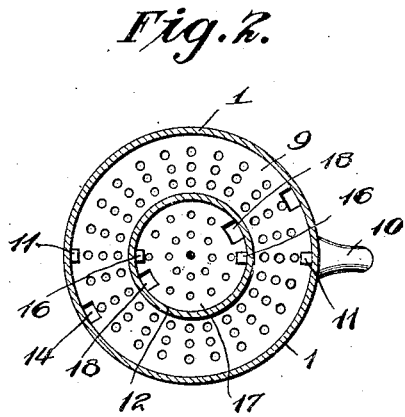
Witnesses
W. C. Fielding
S. M. M'Call
Inventor
Wilbert Maple
By Richard B. Owen,
Attorney

UNITED STATES PATENT OFFICE.

WILBERT MAPLE, OF BLACKWELL, OKLAHOMA.

WATER-FILTER.

1,362,125.     Specification of Letters Patent.     Patented Dec. 14, 1920.

Application filed October 27, 1919. Serial No. 333,798.

*To all whom it may concern:*

Be it known that I, WILBERT MAPLE, a citizen of the United States, residing at Blackwell, in the county of Kay and State of Oklahoma, have invented certain new and useful Improvements in Water-Filters, of which the following is a specification.

This invention relates to filters, and more particularly to filters for use in connection with cisterns.

The object of the invention is to so construct a filter that all light substances will float on the water above the filtering material, and all dirt and sand will pass down through said material and settle where it may be readily removed.

Another object is to construct a filter of this character in sections so assembled that they may be readily taken apart for repairs or for the supplying of new filtering material and yet be strong and substantial.

Another object is to so construct such a filter that it may be easily cleaned by flushing.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of the claimed invention.

In the accompanying drawings:—

Figure 1 represents a central longitudinal section of a filter constructed in accordance with this invention, Fig. 2 is a transverse section taken on the line 2—2 of Fig. 1, and Fig. 3 is a similar view taken on the line 3—3 of Fig. 1.

In the embodiment illustrated, the filter constituting this invention is composed of an outer casing 1 here shown cylindrical in form, although obviously it may be of any other desired cross-sectional contour. The lower end of this casing is in the form of an inverted cone or funnel 2 with a cut-off valve 3 located in its apex. A top 4 is removably mounted on the upper end of the casing 1 and has an overhanging lip or flange 5 to protect its connection with the casing. A perforated partition 6 is mounted in the lower end of the funnel-shaped member 2 at a point spaced above the apex thereof, and rests on an annular shoulder 2ª, being designed to prevent the filtering material from passing below this point, the space formed below it constituting a chamber 6ª for sediment extracted from the water filtered by the device.

Another perforated partition 7 is supported on a shoulder 8 at the junction of the funnel-shaped base 2 with the body of the casing 1. This partition 7 is made annular in form and supports the inner casing 12 presently to be described. Another annular partition 9 is supported in the casing 1 near its upper end, being located just below the discharge spout 10 for the casing, which opens through one side wall thereof. This partition 9 is provided with cutout portions or notches 14 in its periphery to facilitate its passage over the lugs 11 which are carried by the inner face of the casing 1 to support said partition. Two pairs of these lugs 11 are shown arranged at diametrically opposite points, although obviously more may be employed if found necessary. These lugs operate to hold the partition against upward movement such as would be likely to occur owing to the direction of flow of the water being filtered. The lugs of each pair are spaced apart a distance substantially equal to the thickness of the partition 9 as is shown clearly in Fig. 1, to assemble the partition the notches 14 being positioned above the lugs 11 and the partition dropped into place and then turned to place the notches 14 out of register with the lugs, as is shown clearly in Fig. 2.

The inner casing 12 is here shown cylindrical in form and of a size considerably smaller than the outer casing 1 and is adapted to pass through the annular perforated partitions 7 and 9, being equipped near its lower end on its outer face, with an annular flange 15 which rests on the partition 7 as is shown clearly in Fig. 1.

A perforated partition 17 is mounted in the casing 12 near its upper end and is supported by lugs 16 similar to the lugs 11 of casing 1, said partition having peripheral notches 18 to provide for the proper positioning of the partition between the lugs in the same manner as that described above relative to the partition 9.

The upper end of the casing 12 extends through the top 4 of casing 1 and is adapted to be connected with a water supply pipe 25 which may be secured thereto in any suitable manner, being here shown telescoping with the casing 1 and held in engagement therewith by friction.

A cup-shaped perforated partition 19 is supported in the casing 12 above the partition 17 by means of an annular flange or shoulder 20, said partition 19 being arranged obliquely across the casing 12 with its lower end disposed adjacent the lower end of an opening in one side wall of the casing which is closed by an outwardly and upwardly swinging door 22. A lip 21 is positioned above the upper end of the door opening and inclined downwardly so as to direct the inflowing water on to the partition 19 at an angle and prevent all possibility of the inflowing water from opening door 22 which is designed as an overflow.

The space in the casing 1 between the upper partition 9 and the lower partitions 7 and 6 constitutes a filter chamber 13 in which is placed charcoal or any other suitable filtering material, and which is retained in position by said partitions. The casing 12 also has a filter chamber formed therein below the partition 17 and which is indicated by the numeral 23. The lower end of the casing 12 opens directly into the funnel-shaped member 2 and the filtering material in chamber 23 forms a continuation in the chamber 2.

In the use of this filter, the material having been placed in the chambers 13 and 23, and the parts assembled as shown in Fig. 1, water is admitted through the supply pipe 25 from any suitable source, and passes down over lip 21, being directed thereby on to the partition 19, through which it flows and passes through partition 17 into the filtering chamber 23, flowing downward therethrough in the direction of the arrows shown in Fig. 1 and then upward through the partition 7 and chamber 13, passing out of the filter through the spout 10.

When it is desired to clean the filter, the valve or tap 3 is opened and the water rushing out therethrough carries all sediment which has collected in the chamber 6ª. To more effectively clean the filter, the top 4 may be lifted and water poured into the top of the casing 1 which will pass down through the filtering material in the chamber 13 and through the funnel-shaped chamber 2, out through valve 3, thereby completely cleaning the filter.

When it becomes necessary to renew the filtering material, the top 4 is first removed and then the casing 12 lifted out. The partition 9 is removed and also the partitions 7 and 6, so that the entire filter may be thoroughly cleaned, new filtering material substituted, and the parts reassembled with very little trouble.

Should the supply pipe 25 deliver more water than can pass out through the spout 10, the water will rise and lift the door 22 and flow outward, said door dropping by gravity into closed position when the water assumes normal conditions.

While this filter is designed primarily for use in filtering water from roofs of buildings, before it enters cisterns or tanks, it may be used to filter any other water.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention, what I claim as new and desire to secure by Letters Patent, is:—

1. A filter of the class described comprising outer and inner casings spaced apart, the outer casing being closed at its top and bottom with the inner casing opening through the top thereof and adapted to be connected to a water supply pipe, filter chambers formed in said casings, an outlet in said outer casing near its upper end, an overflow in said inner casing in the portion which projects above said outer casing, and means for guiding the entering water to prevent its opening said overflow.

2. A filter of the class described comprising outer and inner casings spaced apart, the outer casing being closed at its top and bottom with the inner casing opening through the top thereof and adapted to be connected to a water supply pipe, filter chambers formed in said casings, an outlet in said outer casing near its upper end, an overflow in said inner casing in the portion which projects above said outer casing, an outwardly opening door for closing said overflow, and a lip positioned over said door to direct the entering water away from the door.

3. A filter comprising inner and outer casings, spaced apart, the outer casing being closed at both ends and having a discharge valve in its lower end, the upper end of said inner casing extending through the top of the outer casing and adapted to be connected with a water supply, the projecting end of said inner casing having an outwardly and upwardly opening door in one side wall, a cup-shaped perforated partition arranged obliquely in said casing with its lower end positioned below the lower end of the door, an inwardly inclined lip positioned over said door to direct the incoming water on to said partition, filtering chambers in said casings communicating with each other, and a discharge spout located in the outer casing above the filter chamber thereof.

4. A filter comprising an outer casing having an inverted cone-shaped bottom with a valve at its apex, a foraminous partition arranged transversely in said bottom at a point spaced from its apex, annular longitudinally spaced foraminous partitions mounted in said casing, a removable top mounted in said casing, a cylindrical inner casing extending through said top and annular partitions with its lower end projecting into said cone-shaped bottom, a perforated partition arranged transversely in said inner casing at a point near its upper end, and a discharge spout opening through one side wall of said outer casing above the uppermost partition thereof.

In testimony whereof I affix my signature in presence of two witnesses.

WILBERT MAPLE.

Witnesses:
J. W. MORSE,
H. J. CLARK.